(12) United States Patent
Lagakos et al.

(10) Patent No.: US 7,020,354 B2
(45) Date of Patent: Mar. 28, 2006

(54) INTENSITY MODULATED FIBER OPTIC PRESSURE SENSOR

(75) Inventors: Nicholas Lagakos, Silver Spring, MD (US); Joseph Bucaro, Herndon, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/446,256

(22) Filed: May 28, 2003

(65) Prior Publication Data

US 2004/0151417 A1    Aug. 5, 2004

Related U.S. Application Data

(60) Provisional application No. 60/383,577, filed on May 28, 2002.

(51) Int. Cl.
*G02B 6/26* (2006.01)

(52) U.S. Cl. .......................................... 385/12; 385/13
(58) Field of Classification Search .................. 385/12, 385/13, 115–120
See application file for complete search history.

(56) References Cited

U.S. PATENT DOCUMENTS

| | | | |
|---|---|---|---|
| 4,162,397 A | 7/1979 | Bucaro et al. | |
| 4,238,856 A | 12/1980 | Bucaro et al. | |
| 4,363,114 A | 12/1982 | Bucaro et al. | |
| 4,427,263 A | 1/1984 | Lagakos et al. | |
| 4,472,022 A * | 9/1984 | Bearcroft et al. | ........... 359/298 |

(Continued)

OTHER PUBLICATIONS

J.A. Bucaro and N. Lagakos, "Lightweight Fiber Optics Microphones and Accelerometers," Review of Scientific Instruments, vol. 72, pp. 2816-2821 (June 2001).

(Continued)

*Primary Examiner*—Brian Healy
*Assistant Examiner*—Eric Wong
(74) *Attorney, Agent, or Firm*—John J. Karasek; Sally A. Ferrett

(57) ABSTRACT

A fiber optic pressure sensor featuring a cartridge housing having an end that is exposed to the atmosphere, a thin flexible membrane covering the exposed end of the cartridge housing such that the flexible membrane has an exposed side and a protected side. A fiber bundle is disposed within the cartridge housing, featuring a transmitting fiber having a first and second ends. The first end has a polished finish and the second end is coupled to a light source. The fiber bundle also features a multitude of receiving fibers disposed around the transmitting fiber with each receiving fiber having first and second ends where the first ends are also polished. The fiber bundle is disposed within the cartridge housing such that the first end of the transmitting fiber and the first end of each receiving fiber is adjacent to the protected side of the flexible membrane with free space between the first fiber end and the protected side of the flexible membrane. A light sensing means is coupled to second end of said receiving fibers wherein light launched into the transmitting fiber propagates emerges at the polished end, propagates a very short distance in air, and is reflected by the flexible membrane into the receiving fibers, propagates therethrough, and is detected by light sensing means. Upon a change in the atmospheric pressure, pressure waves cause the flexible membrane to distort causing a change in the amount of light reflected by the protected side of the flexible membrane. Thus the intensity of the light coupled into the sensing fibers begins to modulate in relation to the intensity of pressure wave.

42 Claims, 8 Drawing Sheets

U.S. PATENT DOCUMENTS

| | | | |
|---|---|---|---|
| 4,482,205 | A | 11/1984 | Lagakos et al. |
| 4,621,896 | A | 11/1986 | Lagakos et al. |
| 4,805,630 | A * | 2/1989 | Storey ........................ 600/488 |
| 4,979,798 | A | 12/1990 | Lagakos et al. |
| 4,994,668 | A | 2/1991 | Lagakos et al. |
| 5,279,793 | A * | 1/1994 | Glass ...................... 422/82.06 |
| 5,367,376 | A | 11/1994 | Lagakos et al. |
| 5,633,960 | A | 5/1997 | Lagakos et al. |
| 5,805,753 | A | 9/1998 | Lagakos et al. |
| 5,825,489 | A | 10/1998 | Lagakos et al. |
| 6,281,976 | B1 * | 8/2001 | Taylor et al. ................ 356/480 |
| 6,439,055 | B1 * | 8/2002 | Maron et al. .................. 73/705 |
| 6,462,445 | B1 | 10/2002 | Weber et al. |
| 6,539,136 | B1 * | 3/2003 | Dianov et al. ................. 385/12 |
| 6,597,820 | B1 * | 7/2003 | Sheem ......................... 385/12 |
| 6,717,337 | B1 | 4/2004 | Howarth et al. |
| 6,738,145 | B1 * | 5/2004 | Sherrer et al. .............. 356/480 |
| 2002/0176592 | A1 | 11/2002 | Howarth et al |
| 2004/0099800 | A1 | 5/2004 | Lagakos et al. |

OTHER PUBLICATIONS

D.R. Miers, D. Raj, and J.W. Berthold, "Design and Characterization of Fiber-Optic Accelerometers," Proc. Fiber Optic Laser Sensor V, SPIE vol. 838, pp. 314-317 (1987).

A.J. Zuckerman, F.W. Cuomo, T.D. Nguyen, S.S. Rizzi, and S.A. Clevenson, "High Temperature Fiber-Optic Lever Microphones," J. Acoustical Society of America, 97 (6) p 3605-16 (Jun. 1995).

J.A. Bucaro, B.H. Houston, T.R. Howarth, R. Corsaro, J. Tressler, and N. Lagakos, Progress toward a "smart acoustic blanket," J. Acoustical Society of America, 107 p 2852 (May 2000). (Abstract).

D.A. Krohn, Fiber Optic Sensors—Fundamentals and Applications (Instrument Society of America, Research Triangle Park, NC), Chapters 3 and 8, (1992).

N. Lagakos, J.H. Cole, and J.A. Bucaro, "Microbend Fiber-optic Sensor," Applied optics 26, p 2171-2180 (June 1987).

G. He and F.W. Cuomo, "Displacement Response, Detection Limit, and Dynamic Range of Fiber Optic Level Sensors," J. Lightwave Tech., vol. 9, No. 11, p 1618-1625 (Nov. 1991).

A. Hu, F.W. Cuomo, J. Zuckerwar, "Theoretical and Experimental Study of a Fiber Optic Microphone," J. Acoustical Society of America, 91, p 3049-60 , (1992).

J.A. Bucaro and N. Lagakos, "Fiber Optics Pressure and Acceleration", Proceeding of the 47th International Instrument symposium, Denver, CO (May 6-10, 2001).

* cited by examiner

| Microphone | Fiber Optic NRL-7130 | 4938 (Preamplifier: 2669L) Bruel & Kjaer | 130A10 (Preamplifier:130P11) The Modal Shop, Inc. |
|---|---|---|---|
| Sensing Element | Reflection diaphragm | Capacitive Diaphragm | PZT |
| Linearity | 1% | 1% | 3% |
| Dynamic Range | 85 dB (expected: 120 dB) | 120 dB | 93 dB |
| Minimum Detectable Pressure | 0.016 Pa/ $Hz^{1/2}$ (possible:1 12 $\mu Pa/Hz^{1/2}$) | 0.004 $Pa/Hz^{1/2}$ | 0.003 $\mu Pa/Hz^{1/2}$ |
| Bandwidth | 0.01- 30 kHz | 0.01-70 kHz | 0.01-20 kHz |
| Acceleration Sensitivity | Axial 3 Pa/g Trans. 1 Pa/g | 0.6 Pa/g | 0.1 Pa/g |
| Size | (Diaphragm diameter: 0.125") 0.25" o.d. 1.5" long | Sensor: 0.25" o.d. 0.41" long Preamplifier: 0.5" 2.5" long | Sensor: 0.25" 1" long Preamplifier 0.25"o.d. 2.125" long |
| Weight | 1.3 gm | Sensor: 1.7 gm Preamplifier: 43 gm | Sensor: 2.2 gm Preamplifier: 3.75 gm |
| Electrical Requirement | Sensor: optical LED-PIN: remote (<200 mW) | Polarization voltage: 200V | Preamplifier: >400 mW |
| Cost | expected: $25 | Sensor: $913 Preamplifier: $753 | Sensor: $110 Preamplifier: $455 |

*FIG. 8*

INTENSITY MODULATED FIBER OPTIC PRESSURE SENSOR

The present application claims the benefit of the priority filing date of provisional application No. 60/383,577 filed on 28 May 2002, hereby incorporated, in its entirety, by reference.

FIELD OF THE INVENTION

This invention relates in general to the field of pressure sensors and in particular to the field of fiber optic pressure sensors.

BACKGROUND

Active sound control systems often require, in addition to actuator and electronic control components, specialized sensor devices. The requirements associated with such sensors to a large part are determined by the particular active control approach employed, as well as the kind of performance expected of the sound controlling system. One type of sensor is the microphone, which measures sound or the existence of atmospheric pressure waves in a particular area of interest.

These sensors are often used as components of instrumentation packages employed on missiles, satellites or other rocket payloads, aircraft or other mechanisms in which atmospheric pressure waves, acceleration or vibration can be quite severe. When in employed in such environments, weight becomes a critical variable. A 10 gram weight differential at rest becomes a 150 gram weight difference during a 15 G acceleration event.

While various electro magnetic microphones offer high levels of sensitivity and good performance in terms of size and efficiency, these electromagnetic devices are often very sensitive to EMI and aren't always physically robust. The hardening of these devices to EMI almost invariably causes an increase in physical size, weight, sensitivity and expense.

The main emphasis has been given to phase modulated interferometric fiber optic sensors for detecting pressure and strain. Though interferometric type sensors offer very high sensitivity, polarization effects and high cost have delayed the implementation of these sensors to commercial applications. Frequency modulated sensors utilizing fiber gratings are very promising for monitoring strain in different location along one fiber.

One solution is to employ microphones that are not electrical or semiconductor in nature. The use of fiber optics for sensors in general, and for sound detection in particular, are one option available to designers which simultaneously solves the EMI sensitivity, size and weight problems inherent in electrical sensors.

Since fiber optics use light rather than electricity, a fiber optic microphone is generally insensitive to EMI, or EMF and is therefore more efficient in an environment that has a large amount of electro magnetic energy. As a result, fiber optic microphones can be located adjacent to or actually attached to electronic devices that generate large electro magnetic fields without negative affects to either the microphone or the area of interest.

Intensity modulated fiber optic sensors, while often less sensitive than comparable interferometric sensors, are simpler and less expensive.

Therefore it is an object of this invention to offer an intensity modulated fiber optic pressure sensor that is small and lightweight.

It is yet a further object to offer a pressure sensor that is EMI insensitive.

It is a further object of this invention to offer a pressure sensor that features high levels of sensitivity.

It is a yet another object offer a pressure sensor that is physically robust.

It is a further object of this invention to offer a pressure sensor that is economical.

SUMMARY

A fiber optic pressure sensor includes a cartridge housing having an end that is exposed to the atmosphere, and a thin flexible membrane covering the exposed end of the cartridge housing such that the flexible membrane has an exposed side and a protected side. A fiber bundle is disposed within the cartridge housing, featuring a transmitting fiber having a first and second ends. The first end has a polished finish and the second end is coupled to a light source. The fiber bundle also features a multitude of receiving fibers disposed around the transmitting fiber with each receiving fiber having first and second ends where the first ends are also polished. The fiber bundle is disposed within the cartridge housing such that the first end of the transmitting fiber and the first end of each receiving fiber is adjacent to the protected side of the flexible membrane with free space between the first fiber end and the protected side of the flexible membrane. A light sensing means is coupled to second end of said receiving fibers wherein light launched into the transmitting fiber propagates emerges at the polished end, propagates a very short distance in air, and is reflected by the flexible membrane into the receiving fibers, propagates therethrough, and is detected by light sensing means. Upon a change in the atmospheric pressure, pressure waves cause the flexible membrane to distort causing a change in the amount of light reflected by the protected side of the flexible membrane. The intensity of the light coupled into the sensing fibers is modulated in relation to the intensity of pressure wave.

BRIEF DESCRIPTION OF THE DRAWINGS

FIG. 8 illustrates the performance characteristics of an exemplary seven fiber microphone/pressure sensor.

DETAILED DESCRIPTION

Figure 1:
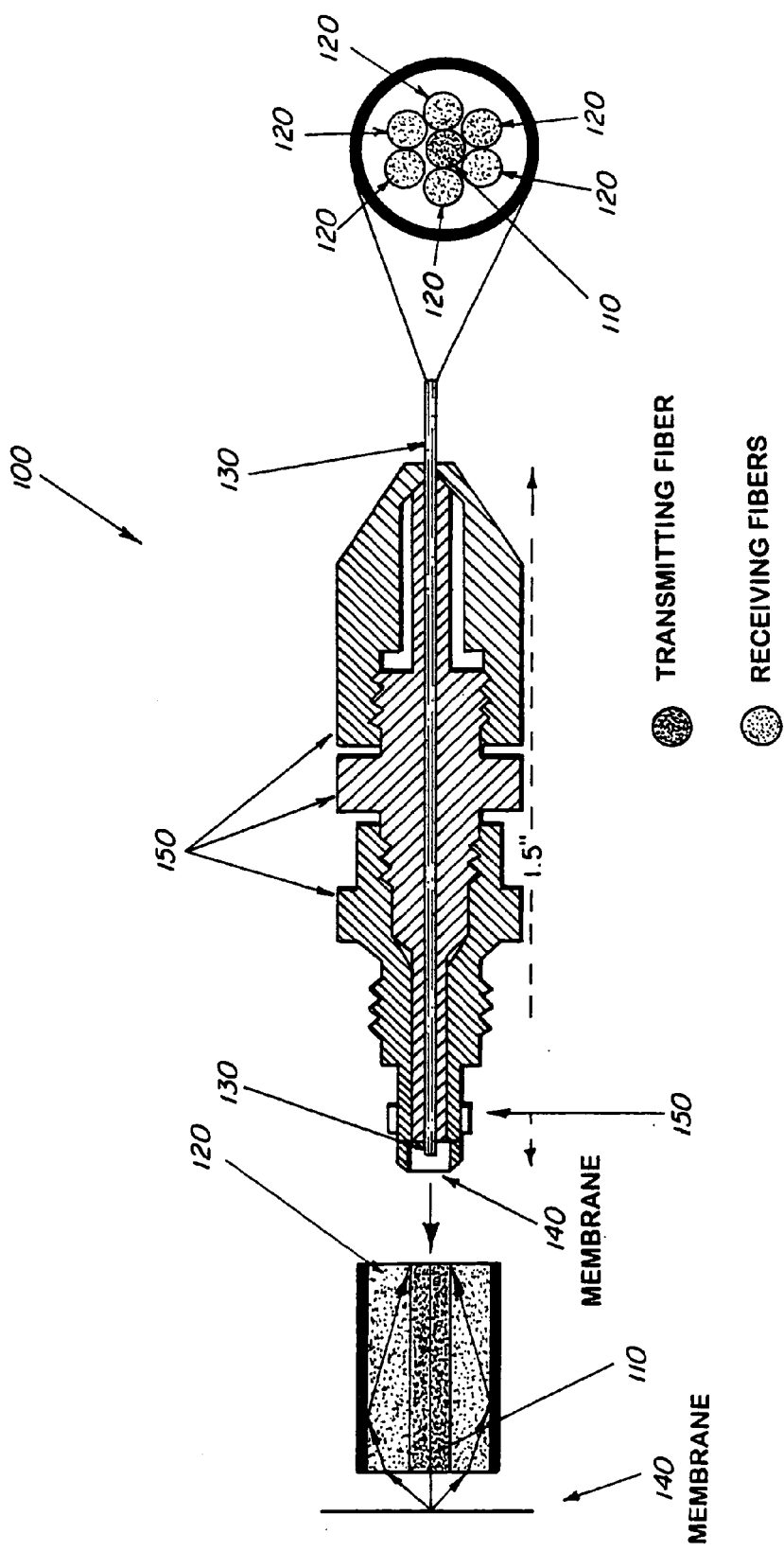
FIG. 1 shows an example embodiment of a fiber optic pressure sensor.

Referring now to the figures where like numbers denote like elements, FIG. 1 shows an example embodiment of a fiber optic pressure sensor.

FIG. 1 shows a fiber optic pressure sensor featuring a cartridge housing 150 having an end that is exposed to the atmosphere, a thin flexible membrane 140 covering the exposed end of the cartridge housing 150 such that the flexible membrane has an exposed side and a protected side. A fiber bundle 130 is disposed within the cartridge housing, featuring a transmitting fiber 110 having a first and second ends. The first end has a polished finish and the second end is coupled to a light source (not shown). The fiber bundle 130 also features a multitude of receiving fibers 120 disposed around the transmitting fiber 110 with each receiving fiber 120 having first and second ends where the first ends are also polished. The fiber bundle 130 is disposed within the cartridge housing 150 such that the first end of the transmitting fiber 110 and the first end of each receiving fiber 120 is adjacent to the protected side of the flexible membrane 140 with free space between the first fiber end and the protected side of the flexible membrane. A light sensing means (not shown) is coupled to second end of said receiving fibers wherein light launched into the transmitting fiber 110 propagates through the transmitting fiber, emerges at the polished end, propagates a very short distance in air, and is reflected by the flexible membrane 140 into the receiving fibers 120, propagates through the receiving fibers, and is detected by light sensing means (not shown).

Upon a change in the atmospheric pressure, pressure waves cause the flexible membrane 140 to distort causing a change in the amount of light reflected by the protected side of the flexible membrane into the receiving fibers 120. Thus the intensity of the light coupled into the receiving fibers 120 modulates in relation to the intensity of pressure wave causing the flexible membrane 140 to distort. These pressure waves can be the result of a change in the environment such as a sound, if the sensor is configure to operate as a microphone. Other modes for the pressure sensor are also possible such as an altimeter mode that senses a change in atmospheric pressure, motion sensor or etc. Other sensor modes based on an event that results in a pressure wave are also possible.

The type of fiber employed in the example embodiment shown in FIG. 1, is generally a multimode fiber having a core that is preferably made of glass. The cladding may be plastic or some other material. In a preferred embodiment fibers with a high numerical aperture are used. Generally fibers with a numerical aperture of>0.2 are employed. A high numerical aperture provides for greater efficiency in the coupling and transmission of light. Fibers featuring high numerical apertures are not required, however. When employed in systems that have a great distance between the source and membrane a fiber having a high numerical aperture is not critical.

Generally multimode fibers with a combination of a thick core and thin clad fiber are preferred. Light incident on clad is lost, thus the core needs to be as close in proximity to the outer perimeter of the clad is possible to ensure efficient light coupling in the core. Thus light coupling within the fiber is maximized with a thick core thin clad structure. This however, does not limit the use of fibers in this device to multimode fibers with thick core thin cladding structures. Varying degrees of effectiveness and light coupling are possible with other fiber configurations.

The fiber optic pressure sensor's cartridge housing is constructed of a rigid and lightweight material. A rigid structure provides the sensor with a robust design. Another advantage to the rigid structure is that the sensor is very resistant to vibration, G forces and other structural forces with could impact sensor performance.

The cartridge housing features means to adjust the distance between the polished end of the transmitting fiber and the flexible membrane.

In the preferred embodiment the system employs a screw type configuration, with a locking nut and an adhesive material applied to the nut to maintain a consistent distance. This configuration also provides the user the ability to adjust the distance from the fiber bundle to the flexible membrane by very small increments, and to lock or otherwise maintain a consistent distance in a dynamic environment.

While other attachment and adjustment methods may be applied to the sensor as an adjustment means, to extract optimum performance from the sensor the mechanism must be resistant to vibration and temperature variations. If the distance from the fiber bundle to the membrane is not maintained precisely, the accuracy and sensitivity of the sensor package will suffer.

The cartridge housing features means to adjust the tension of the flexible membrane drawn across the exposed end of the cartridge housing. This may be accomplished via a screw type adjustment or some other means of adjustment.

The flexible membrane also features a coating on the protected side to enhance its light reflecting properties. In a preferred embodiment the flexible membrane is constructed of mylar and features at least one surface coated with thin aluminum film. The aluminum film increases the light reflecting properties of the flexible membrane, however other coatings may be applied to increase the membrane's sensitivity, or toughness.

The fiber optic pressure sensor fiber bundle features a single multimode transmitting fiber and a multitude of receiving fibers all encased in a protective tubing. In the example embodiment shown in FIG. 1 the protective tubing is a stainless steel tubing, yet other type of tubing may be used to encase the fiber bundle. One will appreciate that the type of tubing, if any, that is used to encase the fiber bundle is not limiting to this invention.

The light sensing means is at least one silicon PIN diode. LEDs represent a very efficient way to launch light into the fiber. LED are generally low cost and feature low noise operation in a fiber system. LEDs are also tend to be very stable over extended periods of time. Laser diodes are also applicable, although they increase the expense and complexity of the system. Current laser diodes, also tend to introduce additional noise to the sensor package. One suitable LED for use as a light source is an Optek OPF370A LED emitting light at 850 nm.

In another embodiment of the fiber optic pressure sensor the fiber optic pressure sensor features a cartridge housing having an end that is exposed to the atmosphere, a thin flexible membrane covering the exposed end of the cartridge housing such that the flexible membrane has an exposed side and a protected side. A fiber bundle is disposed within the cartridge housing, featuring a transmitting fiber having a first and second ends.

The first end has a polished finish and the second end is coupled to a light source. The fiber bundle also features a receiving fiber disposed adjacent to the transmitting fiber. The receiving fiber has a first and second end where the first end is also polished. The fiber bundle is disposed within the cartridge housing such that the first end of the transmitting fiber and the first end of the receiving fiber is adjacent to the protected side of the flexible membrane with free space between the first fiber end and the protected side of the flexible membrane. A light sensing means is coupled to second end of the receiving fiber wherein light launched into the transmitting fiber propagates emerges at the polished end, propagates a very short distance in air, and is reflected by the flexible membrane into the receiving fiber, propagates through the receiving fiber, and is detected by light sensing means. Upon a change in the atmospheric pressure, pressure waves cause the flexible membrane to distort causing a change in the amount of light reflected by the protected side of the flexible membrane into the receiving fiber. Thus the intensity of the light coupled into the sensing fiber modulates in relation to the intensity of pressure wave causing the flexible membrane to distort.

Figure 2:
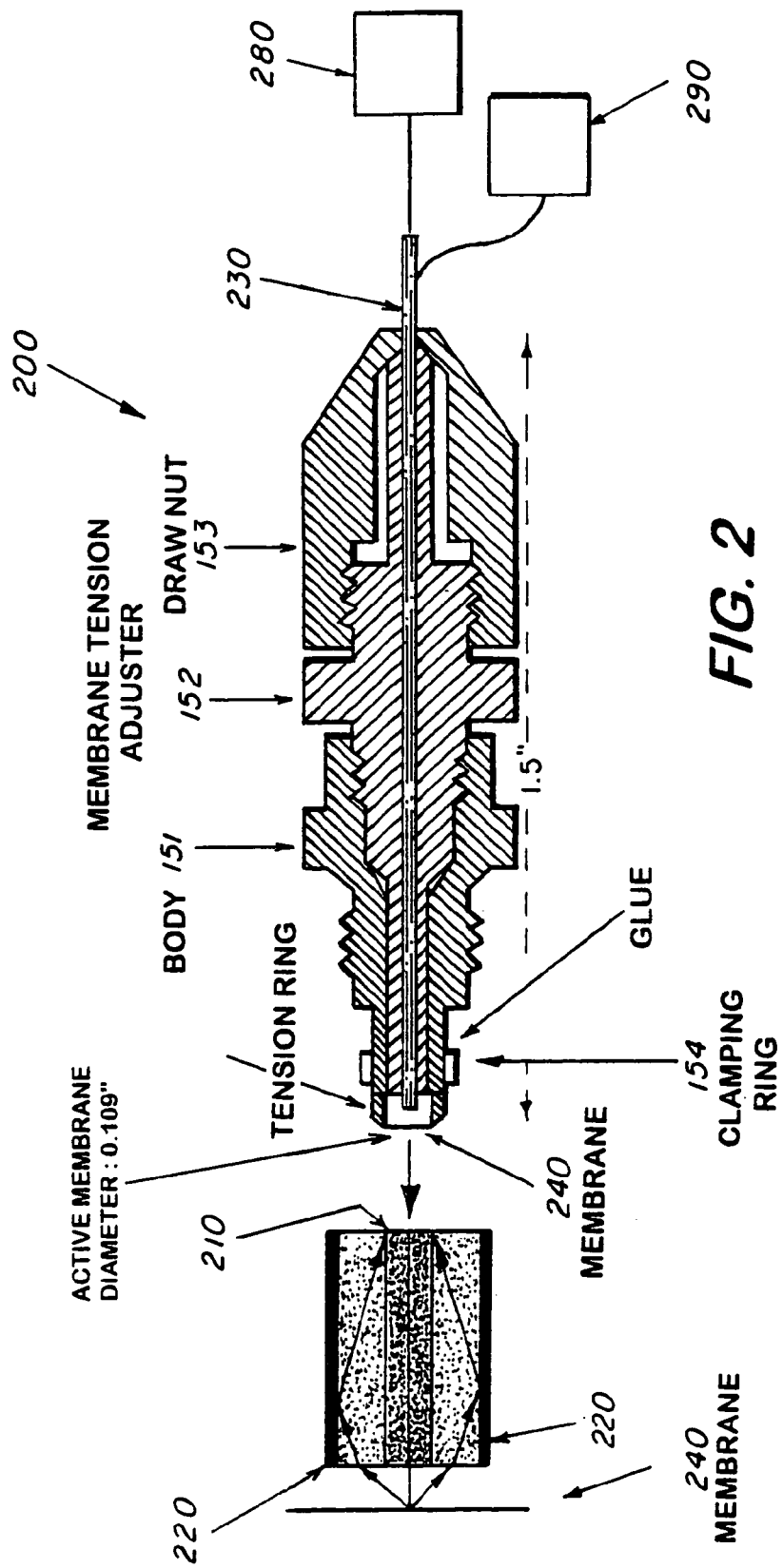
FIG. 2 shows an example embodiment of a fiber optic pressure sensor used as a microphone.

FIG. 2 show an exemplar of a pressure sensor having the structure as described above, employed as a microphone. The device uses an LED emitting at 850 nm as the light source 280 with a silicon PIN diode as the light sensing means 290. The fiber bundle 230 disposed within the cartridge housing, comprises 6 multimode receiving fibers 220 surrounding a single multimode transmitting fiber 210. The cartridge housing 150 is formed with screw type adjustments for fiber to membrane distance 153 and for membrane tension 152, and a clamping ring 154 also for setting and maintaining the membrane tension. The fiber bundle 230 is housed within a plastic cartridge made from Noryl. The weight of the sensor is 1.3 grams. The first end has a highly polished finish and the second end of the transmitting fiber is coupled to the light source. The second ends of the receiving fibers are coupled to the light sensing means while the first ends also feature a highly polished finished. The optical fiber features a 200 µm glass core, and 230 µm plastic clad, a 500 µm Tefzel plastic coating, and a numerical aperture of approximately 0.37. The plastic coating is removed. A suitable stripper for removing the plastic coating has an approximately 305 µm blade hole. The seven fiber bundle is inserted into a stainless steel tube with 1.270 mm outer diameter and 838 µm inner diameter, so the fiber bundle is contained within the tube, forming a probe.

Epoxy is applied to the seven fibers so the fibers form a symmetric bundle close to the tubing end with the transmitting fiber at the center and cured. After curing, the fiber bundle can be cut close to the tubing end and the probe end can be polished. The probe, which includes the bundle and the protecting stainless steel tube, is housed within the plastic cartridge housing. The fiber bundle 230 is disposed within the cartridge housing 150 such that the first end of the transmitting fiber and the first end of each receiving fiber is adjacent to the protected side of the flexible membrane 240 with free space between the first fiber end and the protected side of the flexible membrane. The flexible membrane 240 is a $1.27 \times 10^{-3}$ cm mylar (polyester) layer, having one surface that is coated with a thin aluminum film. The tension on the mylar membrane is adjusted to achieve the desired acoustic bandwidth. The membrane- probe separation is also adjusted to achieve the desired bandwidth sensitivity. A somewhat broad dynamic sensitivity maximum was found for a probe—membrane separation between 180 and 250 µm.

Upon a change in the atmospheric pressure, pressure waves cause the flexible membrane to distort causing a change in the amount of light reflected by the protected side of the flexible membrane into the receiving fibers. Thus the intensity of the light coupled into the receiving fibers modulates in relation to the intensity of pressure wave causing the flexible membrane to distort.

In yet another embodiment a single fiber may be used as the transmitting and receiving fiber. In this embodiment the light source and the means for sensing the received light are both coupled to the fiber end. The light is launched from the fiber into the flexible membrane and is reflected back into the same fiber.

In the single fiber embodiment, it is suitable to use a multimode optical fiber with a 200 µm glass core, and 230 µm plastic clad, a 500 µm Tefzel plastic coating, and a numerical aperture of approximately 0.37. The probe housing is a stainless steel tube of 902 µm outer diameter and 584 µm inner diameter. To form the probe, the fiber is inserted in the tubing with its coating and epoxy is applied on the fiber. After the epoxy has cured, the fiber is cut closely to the tubing and the end of the fiber is polished well. A 50/50 (at 850 nm), low loss, optical coupler, such as one manufactured by Gould Electronics, can be used in the one fiber probe.

Figure 3:
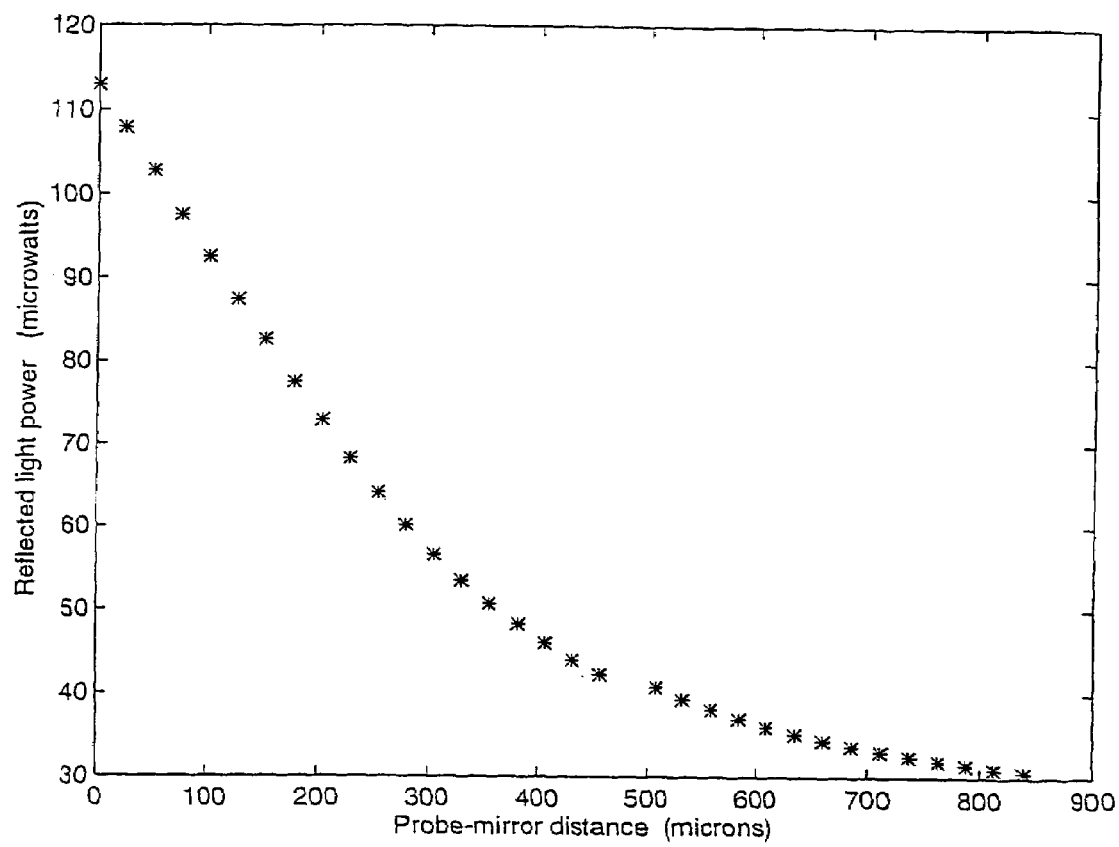
FIG. 3 illustrates the dc displacement sensitivity of a one-fiber probe pressure sensor versus the probe end to mirror distance.

FIG. 3 illustrates the displacement sensitivity of the one-fiber probe. The displacement sensitivity of the one fiber probe can be studied by mounting it on a micrometer translator which can be displaced manually against a mirror mounted on a piezoelectric transducer (PZT4 cylinder of 2 inch outer diameter and 3 inch length) which can be vibrated electrically. The probe is displaced manually against the mirror in steps of 25.4 µm using a micrometer translator. Results are shown in FIG. 3 where the power of the reflected light coupled into the same fiber is plotted vs. the probe—mirror distance. As can be seen from this figure, maximum displacement sensitivity is achieved in the 0–150 µm probe—mirror distance.

Figure 4:
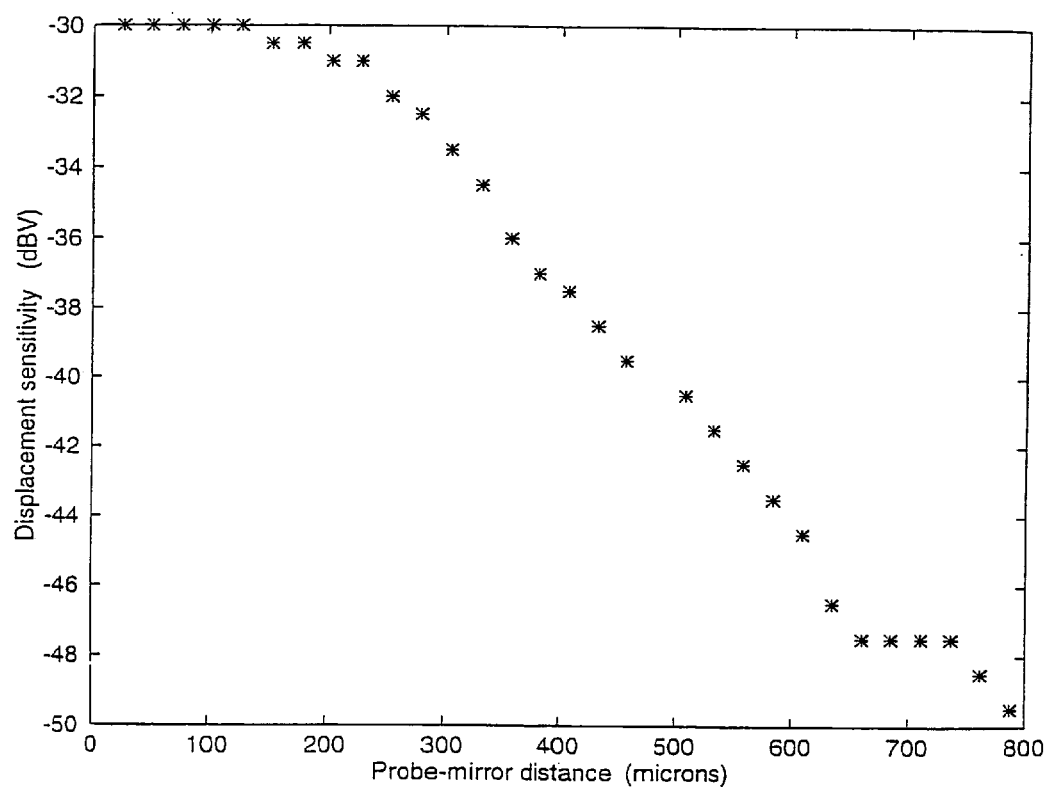
FIG. 4 illustrates the ac displacement sensitivity of a one-fiber probe pressure sensor versus the probe end to mirror distance.

The one fiber probe can also be dynamically displaced against the mirror by vibrating the PZT transducer electrically. The displacement amplitude of the vibrating mirror can be obtained from the output of a small reference accelerometer (for example, the Endevco 2250A) mounted close to the mirror. Results are shown in FIG. 4, which shows the ac displacement sensitivity as a function of the probe—mirror distance. As can be seen from this figure, the sensitivity is maximum and approximately constant in the 0–150 µm region, in agreement with the dc displacement results of FIG. 3. These results illustrate that an optimum operating distance of the 1 fiber probe end from the reflecting surface is about 60 µm and the optimum operating region is 0–120 µm, for this type of transmitting fiber, although other operating distances can be used.

Figure 5:
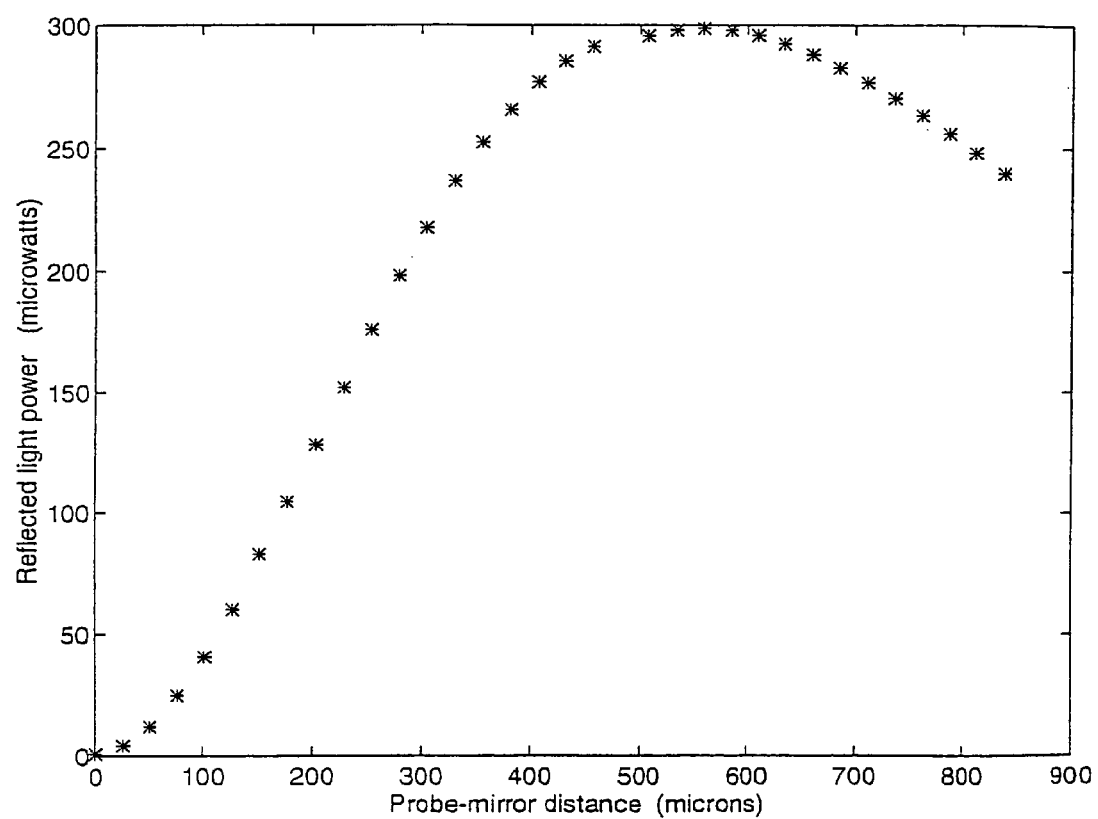
FIG. 5 illustrates the dc displacement sensitivity of a seven fiber probe pressure sensor versus the probe end to mirror distance.

FIG. 5 illustrates the dc displacement sensitivity of the 7 fiber probe, which was studied in a similar way to that of the one—fiber probe. In FIG. 5, the reflected light power coupled into the 6 receiving fibers is plotted vs. the probe—mirror distance. The maximum displacement sensitivity is achieved for a probe—mirror distance of about 180–250 µm and is about $9.38 \times 10^{-11}$ W/A, where A is equal to $10^{-8}$ cm. By comparing the results in FIGS. 3 and 5, it is seen that the region of maximum sensitivity of the seven fiber probe is different than that of the 1 fiber probe. For example, the maximum sensitivity region for the one fiber probe is found at close to zero probe-mirror distance, while the maximum sensitivity region for the seven fiber probe, the maximum sensitivity is achieved at a greater distance. Another difference is that with the seven fiber probe, significantly higher light power is detected. This is believed to be due primarily to the coupler used in the one fiber probe which reduces the power by at least about 50%.

Figure 6:
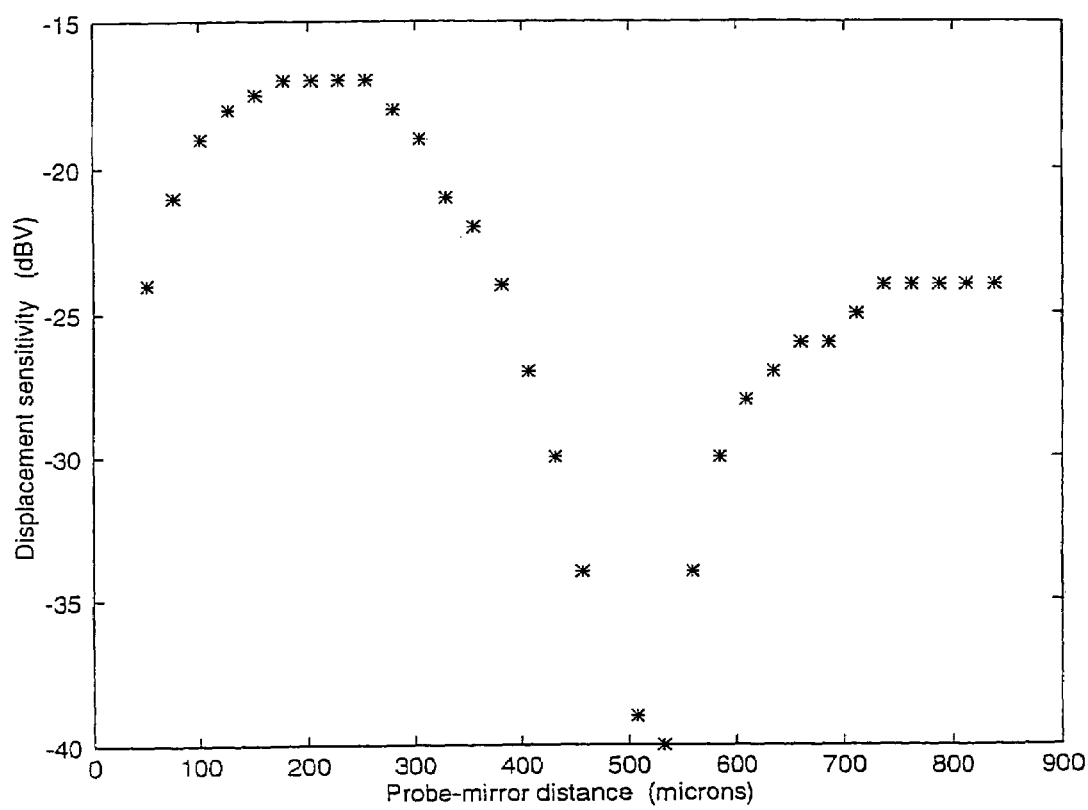
FIG. 6 illustrates the ac displacement sensitivity of a seven fiber probe pressure sensor versus the probe end to mirror distance.

FIG. 6 illustrates the displacement sensitivity plotted as a function of the probe-mirror distance for the seven-fiber probe. These results were obtained in a similar way as the FIG. 4 results for the one-fiber probe. As can be seen from this figure, maximum displacement sensitivity is achieved in the probe—mirror distance range of 180–250 µm, in agreement with the dc displacement results of FIG. 5. This maximum displacement sensitivity range indicates that an optimum probe—reflecting surface distance can be about 220 µm. From FIGS. 6 and 4, it is apparent that the the maximum ac displacement sensitivity of the seven fiber probe is about 13 dB higher than that of the one fiber probe.

Thus, the increased sensitivity difference and the high cost of the multimode coupler used in the one fiber probe make a seven-fiber probe sensor better for some applications than a one fiber probe sensor, even though the one fiber probe sensor uses only one fiber instead of seven. In other applications, for example, in remote sensing applications in which longer fiber lengths are needed, a one-fiber probe sensor can be a better choice.

Based on the results shown in FIG. 6, the displacement sensitivity of the 7 fiber probe was calculated from the signals of the probe and the reference accelerometer and was found to be equal to $6.35 \times 10^{-11}$ W/A. This result is slightly less than the $9.35 \times 10^{-11}$ W/A sensitivity calculated from the dc displacement procedure, the results of which are shown in FIG. 5.

Typically, a good PIN detector can detect a fraction of a picowatt ac signal, the minimum detectable displacement limited by the detector noise is: minimum detectable displacement>0.01 A.

Pressure can be detected by replacing the mirror used in the fiber probe with a reflecting surface such as a reflecting membrane. The membrane used in a one or seven fiber pressure sensor such as the one shown in FIGS. 1 and 2 can be a 12.7 μm mylar film whose surface is metallized with a thin aluminum coating. The reflecting membrane can be placed at an optimum distance from the probe end for maximum sensitivity and the membrane's tension can be set to an optimum tension for achieving the desired microwave bandwidth.

The cartridge provides mechanisms for applying the desired membrane tension and for clamping the probe in place at the optimum membrane-probe end distance. The optimum membrane-probe end disatnce can be found in practice by adjusting the distance, monitoring the detected light from the receiving fibers, and taking into account the FIG. 5 and FIG. 6 calibration for the seven fiber probe. Similarly, FIGS. 3 and 4 can be used to determine the optimum membrane-probe end distance for a one-fiber probe.

Figure 7:
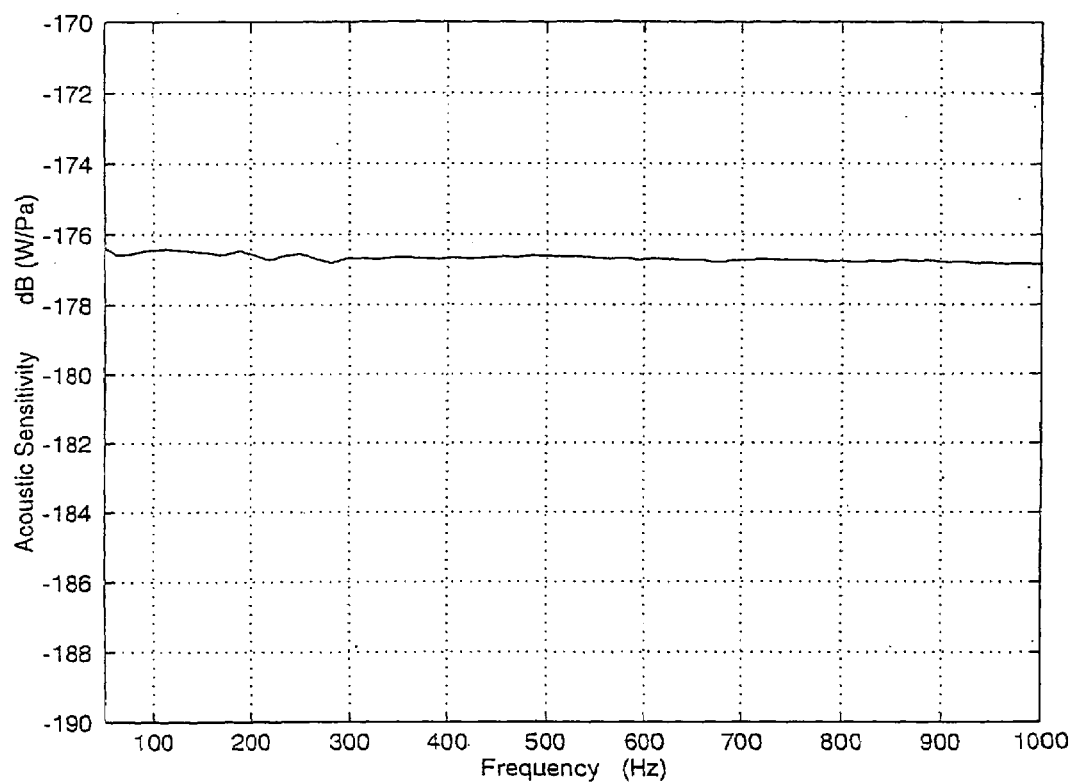
FIG. 7 illustrates the acoustic sensitivity of a seven fiber probe pressure sensor in the frequency range 10–1000 Hz.

The pressure response of the seven fiber probe microphone illustrated in FIGS. 1 and 2 can be found by placing it in a high pressure microphone calibrator, for example, type 4221 Bruen & Kjaer (B&K). A reference microphone, for example, a ¼" pressure-field 4938 B&K microphone, with a 2669 B&K preamplifier and a 2690 B&K amplifier can be used. A pulse is applied on the pressure calibrator and the output signals of the fiber and the 4938 microphones are recorded and stored in a Macintosh computer using a ML750/M PowerLab recorder. About 1 mW light power is coupled into the transmitting fiber from the LED which is driven at 100 mA. The detector is a PIN silicon detector, model PDA 55made by Thorlabs. Results are shown in FIG. 7, in which the acoustic sensitivity of the fiber microphone is plotted in the frequency range of 50–1000 Hz. As can be seen from this figure, the frequency response of the acoustic sensitivity of the fiber optic microphone is frequency independent in this frequency range. The frequency response of the fiber optic microphone was studied also at frequencies much higher than 1 kHz and was found to be frequency independent. As can be seen from FIG. 7, the pressure sensitivity of the 7 fiber probe microphone is: Acoustic sensitivity=$1.5 \times 10^{-9}$ W/Pa.

The noise equivalent power (NEP) of a good detector is approximately 0.17 pW/Hz$^{1/2}$ (e.g., the EG&G model HUV-1100 PIN detector with a preamplifier), which corresponds to a minimum detectable pressure of 41 dB re 1 μPa/Hz$^{1/2}$. Typically, however, noise from other sources can limit the minimum detectable pressure, so the minimum detectable pressure will be higher than 41 dB it would be higher than 41 dB re 1 μPa/Hz$^{1/2}$.

In the above-mentioned experiment, the light source is the OPF 370A Optek LED driven by a LD-3620 Lightwave Technology Power supply and the detector is a PDA 55 PhorLabs PIN whose output is stored directly into 3582A HP spectrum analyzer. The minimum detected pressure for this arrangement was found to be 84 dB re 1 μPa/Hz$^{1/2}$.

FIG. 8 illustrates the main characteristics of the exemplary seven fiber microphone described herein compared to commercially available microphones, the 4938 B&K and the 130A10 Modal Shop. The fiber microphone linearity results are comparable to the 4938 B&K microphone and better than the 130A10 Modal Shop microphone. The acceleration sensitivity of the fiber microphone, which was found to be higher than that of the other two microphones, is believed to be due primarily to the lead noise. The diaphragm diameter is less than ⅛ inch in the fiber microphone compared to ¼ inches in the comparison microphones. An increase of this diameter affects the bandwidth and minimum detectable pressure, as discussed further herein. The size, weight, cost, and electrical requirements of the fiber microphone are lower than that of the comparison microphones. Note that the comparison microphones require a preamplifier to minimize EMI. The dynamic range of the pressure sensor is higher than 60 dB and its linearity is 1%. The acceleration sensitivity, which can introduce significant noise in a dynamic environment, was studied by mounting the pressure sensor on a piezoelectric shaker. The sensor was vibrated along the fiber—probe axis and perpendicularly to it. The axial and transverse acceleration sensitivities of the sensor were found to be 3 Pa/g and 1 Pa/g, respectively.

The minimum detectable pressure and bandwidth of a microphone with a diagragm can be determined by the following equations, in which T is the tension, $p_m$ is the density, and r is the radius of the diaphragm:

For conventional microphones such as the 4938 B&K: $x/p = r^2/(4T)$, where x is the displacement of the diaphragm generated by an applied pressure p.

For the fiber microphone: $x/p = r^2/(8T)$.

By comparing these equations, it is apparent that the sensitivity of the fiber microphone is twice as high as that of conventional microphones. Further, the microphone sensitivity is directly proportional to the radius squared. Thus, the minimum detectable pressures for the fiber microphone and the 4938 microphone are expected to be about the same for diaphragms of the same radius. Thd microphone sensitivity is also inversely proportional to the diaphragm tension. On the other hand, the first resonance of the microphone, which determines the microphone bandwidth, is inversely proportional to the radius and proportional to the square root of the tension: $f_R = (2.4/(2\pi r))^* (T/(p_m t))^{1/2}$.

In general, the radius and tension of the diaphragm can be chosen to satisfy the required minimum detection pressure, bandwidth, and size of the microphone.

Although this invention has been described in relation to the exemplary embodiments thereof, it is well understood by those skilled in the art that other variations and modifications can be affected on the preferred embodiment without departing from scope and spirit of the invention as set forth in the claims.

The invention claimed is:

1. A fiber optic pressure sensor comprising:
a cartridge housing having an end that is exposed to the atmosphere;
a thin flexible membrane covering the exposed end of the cartridge housing such that the flexible membrane has an exposed side and a protected side;
a fiber bundle disposed within the cartridge housing, the fiber bundle comprising
a transmitting fiber having a first and second end, the first end having a polished finish and the second end coupled to a light source, and
a multitude of receiving fibers disposed around the transmitting fiber, each receiving fiber having first and second ends,
the housing end extending beyond the first end of the transmitting fiber and the first ends of the receiving fibers in a direction along a fiber axis to maintain the membrane at a distance from the fibers,
the fiber bundle is disposed within the cartridge housing such that the first end of the transmitting fiber and the first end of each receiving fiber is adjacent to the protected side of the flexible membrane with free space between the first fiber end and the protected side of the flexible membrane; and
light sensing means coupled to second end of said receiving fibers,
wherein light launched into the transmitting fiber emerges at the polished end, propagates a very short distance in air, and is reflected by the flexible membrane into the receiving fibers, propagates therethrough and is detected by the light sensing means, upon a change in the atmospheric pressure, pressure waves cause the flexible membrane to distort causing the amount of light reflected by the protected side of the flexible membrane and the intensity of the light coupled into the receiving fibers to modulate.

2. The fiber optic pressure sensor of claim 1 wherein the cartridge housing is constructed of a rigid and light weight material.

3. The fiber optic pressure sensor of claim 1 wherein the cartridge housing comprises means to adjust the distance between the polished end of the transmitting fiber and the flexible membrane.

4. The fiber optic pressure sensor of claim 1 wherein the cartridge housing comprises means to adjust the tension of the flexible membrane drawn across the exposed end of the cartridge housing.

5. The fiber optic pressure sensor of claim 1 wherein the flexible membrane comprises a coating on the protected side to enhance its light reflecting properties.

6. The fiber optic pressure sensor of claim 5 wherein the flexible membrane comprises mylar with at least one surface coated with thin aluminum film.

7. The fiber optic pressure sensor of claim 1 wherein the fiber bundle comprises a single multimode transmitting fiber and a multitude of receiving fibers all encased in a protective tubing, the tubing disposed within the cartridge housing.

8. The device of claim 7 wherein the protective tubing is a stainless steel tubing.

9. The device of claim 1 wherein the light sensing means is at least one silicon PIN diode.

10. The device of claim 1 wherein the light source is a light emitting diode.

11. A fiber optic pressure sensor comprising:
a cartridge housing having an end that is exposed to the atmosphere;
a thin flexible membrane covering the exposed end of the cartridge housing such that the flexible membrane has an exposed side and a protected side;
a fiber bundle disposed within the cartridge housing, the fiber bundle comprising
a transmitting fiber having a first and second end the first end having a polished finish and the second end coupled to a light source, and
a receiving fiber having a first and a second end, disposed adjacent to the transmitting fiber,
the fiber bundle is disposed within the cartridge housing such that the first end of the transmitting fiber and the first end of the receiving fiber is adjacent to the protected side of the flexible membrane with free space between the first fiber end and the protected side of the flexible membrane,
the housing end extending beyond the first end of the transmitting fiber and the first end of the receiving fiber in a direction along a fiber axis to maintain the membrane at a distance from the fibers; and
light sensing means coupled to the second end of said receiving fiber,
wherein light launched into the transmitting fiber emerges at the polished end, propagates a very short distance in air, and is reflected by the flexible membrane into the receiving fiber, propagates therethrough and is detected by light sensing means, upon a change in the atmospheric pressure, pressure waves cause the flexible membrane to distort causing the amount of light reflected by the protected side of the flexible membrane and the intensity of the light coupled into the receiving fiber to modulate.

12. The fiber optic pressure sensor of claim 11 wherein the cartridge housing is constructed of a rigid and light weight material.

13. The fiber optic pressure sensor of claim 11 wherein the cartridge housing comprises means to adjust the distance between the polished end of the transmitting fiber and the flexible membrane.

14. The fiber optic pressure sensor of claim 11 wherein the cartridge housing comprises means to adjust the tension of the flexible membrane drawn across the exposed end of the cartridge housing.

15. The fiber optic pressure sensor of claim 11 wherein the flexible membrane comprises a coating on the protected side to enhance its light reflecting properties.

16. The fiber optic pressure sensor of claim 15 wherein the flexible membrane comprises mylar with at least one surface coated with thin aluminum film.

17. The fiber optic pressure sensor of claim 11 wherein the fiber bundle comprises a multimode transmitting fiber and a multimode receiving fiber encased in a protective tubing.

18. The device of claim 17 wherein the protective tubing comprises stainless steel tubing.

19. The device of claim 11 wherein the light sensing means is at least one silicon PIN diode.

20. The device of claim 11 wherein the light source is a light emitting diode.

21. A fiber optic pressure sensor comprising:
a cartridge housing having an end that is exposed to the atmosphere,
a thin flexible membrane covering the exposed end of the cartridge housing such that the flexible membrane has an exposed side and a protected side;
a fiber bundle disposed within the cartridge housing, the fiber bundle comprising a single transmitting and receiving fiber having a first and second end, the first end having a polished finish and the second end couple to a light source, the housing end extending beyond the first end of the fiber in a direction along a fiber axis to maintain the membrane at a distance from the fibers, the fiber bundle is disposed within the cartridge housing such that the first end of the fiber is adjacent to the protected side of the flexible membrane with free space between the first fiber end and the protected side of the flexible membrane;

light sensing means also coupled to second end of said fiber, wherein light launched into the fiber propagates through the fiber, emerges at the polished end, propagates a very short distance in air, and is reflected by the flexible membrane back into the fiber, propagates therethrough and is detected by light sensing means, upon a change in the atmospheric pressure, pressure waves cause the flexible membrane to distort causing the amount of light reflected by the protected side of the flexible membrane and the intensity of the light coupled into the fiber to modulate.

22. A sensor according to claim 1, wherein the membrane and the cartridge housing form a space separated from an exterior of the sensor by the membrane and the housing.

23. A sensor according to claim 22, wherein the space contains the air.

24. A sensor according to claim 1, wherein the receiving fibers are multimode fibers.

25. A sensor according to claim 11, wherein the membrane and the cartridge housing form a space separated from an exterior of the sensor by the membrane and the housing.

26. A sensor according to claim 25, wherein the space contains the air.

27. A sensor according to claim 11, wherein the receiving fiber is a multimode fiber.

28. A fiber optic pressure sensor comprising:
a cartridge housing having an end that is exposed to the atmosphere;
a thin flexible membrane covering the exposed end of the cartridge housing such that the flexible membrane has an exposed side and a protected side; and
a fiber bundle disposed within the cartridge housing, the fiber bundle comprising
a transmitting fiber having a first and second end, the first end having a polished finish, the second end arranged for being coupled to a light source, and
a plurality of receiving fibers disposed around the transmitting fiber, each receiving fiber having first and second ends,
the fiber bundle being disposed within the cartridge housing such that the first end of the transmitting fiber and the first end of each receiving fiber is adjacent to the protected side of the flexible membrane with free space between the first fiber end and the protected side of the flexible membrane, the free space containing a gas,
the housing end extending beyond the first end of the transmitting fiber and the first ends of the receiving fibers in a direction along a fiber axis to maintain the membrane at a distance from the fibers.

29. The fiber optic pressure sensor according to claim 28, wherein the gas is air.

30. The fiber optic pressure sensor according to claim 28, wherein light emerges from the polished end of the transmitting fiber and is reflected by the flexible membrane into the receiving fibers, wherein a change in the atmospheric pressure external to the cartridge housing causes the flexible membrane to distort, causing an amount of light reflected by the protected side of the flexible membrane and the intensity of the light coupled into the receiving fibers to modulate.

31. The fiber optic pressure sensor according to claim 28, further comprising a light sensor arranged to receive light from the receiving fibers.

32. The fiber optic pressure sensor according to claim 28, further comprising a tensioner arranged to adjust the membrane tension.

33. The fiber optic pressure sensor according to claim 32, wherein the tensioner includes a threaded body threadingly engaged between the cartridge housing and a draw nut.

34. A fiber optic pressure sensor comprising:
a cartridge housing having an end that is exposed to the atmosphere;
a thin flexible membrane covering the exposed end of the cartridge housing such that the flexible membrane has an exposed side and a protected side; and
a fiber bundle disposed within the cartridge housing, the fiber bundle comprising
a single transmitting fiber having a first polished end and a second end for being coupled to a light source, and
a single receiving fiber adjacent to the transmitting fiber, the receiving fiber having first and second end, the second end for being coupled to a light sensing device,
the fiber bundle being disposed within the cartridge housing such that the first end of the transmitting fiber and the first end of each receiving fiber is adjacent to the protected side of the flexible membrane with free space between the first fiber end and the protected side of the flexible membrane, the free space containing a gas,
the housing end extending beyond the first ends of the fibers in a direction along a fiber axis to maintain the membrane at a distance from the fibers.

35. The sensor according to claim 34, wherein light emerges from the polished end of the transmitting fiber and is reflected by the flexible membrane into the receiving fiber, wherein a change in the atmospheric pressure external to the cartridge housing causes the flexible membrane to distort, causing an amount of light reflected by the protected side of the flexible membrane and the intensity of the light coupled into the receiving fiber to modulate.

36. A fiber optic pressure sensor according to claim 21, wherein the fiber is multimode.

37. A fiber optic pressure sensor according to claim 21, wherein the fiber is multimode.

38. A fiber optic pressure sensor comprising:
a cartridge housing having an end that is exposed to an atmosphere,
a thin flexible membrane covering the exposed end of the cartridge housing such that the flexible membrane has an exposed side and a protected side,
a fiber bundle disposed within the cartridge housing, the fiber bundle including at least one optical fiber, the fiber bundle being disposed within the cartridge housing such that the first end of the transmitting fiber is adjacent to the protected side of the flexible membrane with free space between the first fiber end and the protected side of the flexible membrane, the free space being separated from the atmosphere by the cartridge housing and the membrane and having a gas enclosed therein, and at least one member threadingly engaged with the cartridge housing arranged to adjust the tension of the membrane or a distance between the first fiber end and the membrane.

39. The sensor of claim 28, the transmitting fiber being arranged at a centerline of the fiber bundle.

40. The sensor of claim 28, the sensor membrane being spaced apart from the first ends of the receiving fibers by 180 to 250 microns.

41. The sensor of claim 28, wherein the plurality of receiving fibers includes six receiving fibers.

42. The sensor of claim 28, wherein sensor has an acoustic sensitivity of at least $1.5 \times 10^{-9}$ W/Pa over a frequency range of 50 to 1000 Hz.

* * * * *